UNITED STATES PATENT OFFICE.

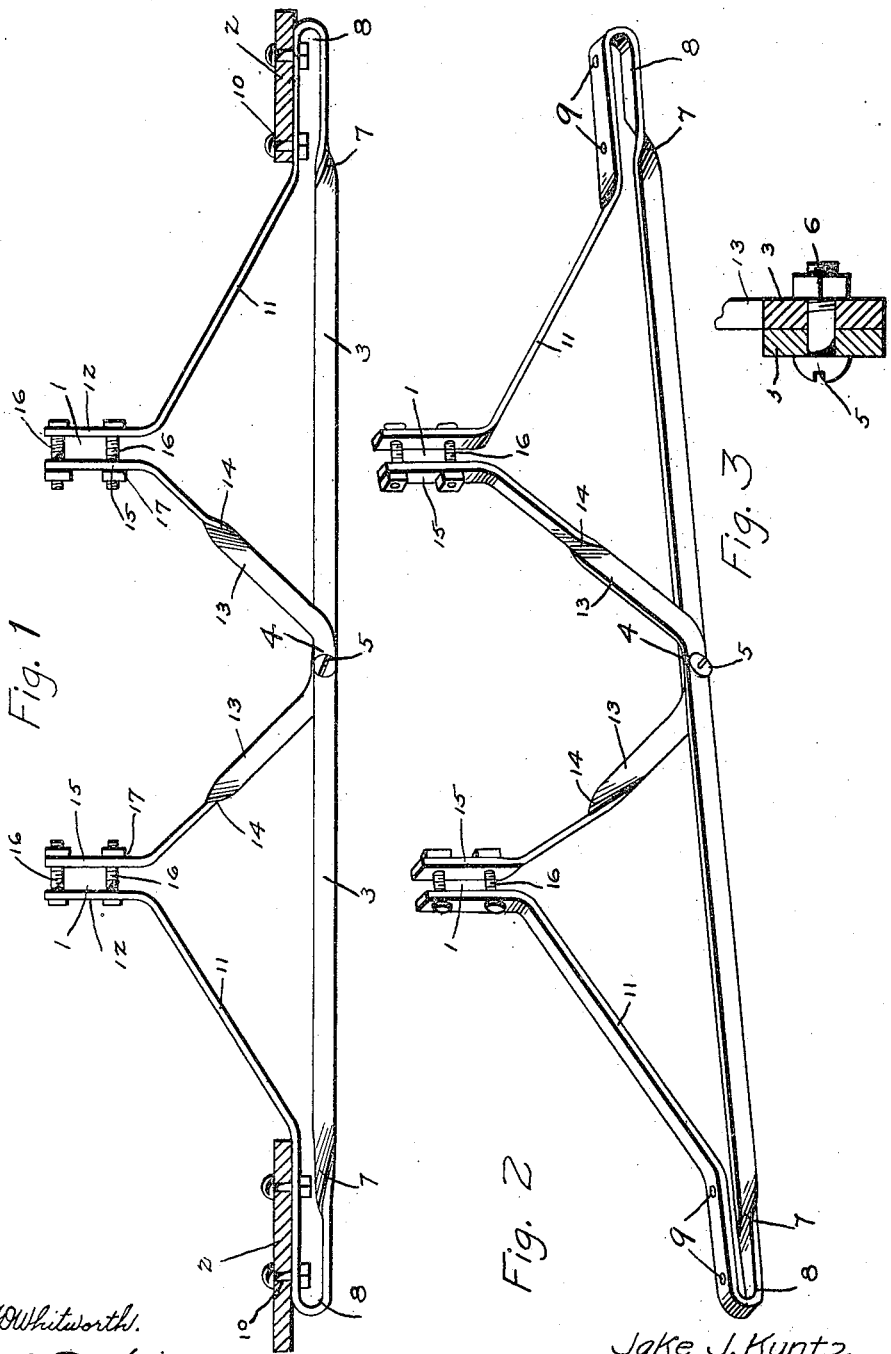

JAKE J. KUNTZ, OF OAKVILLE, IOWA.

AUTOMOBILE-FENDER BRACE.

1,375,594.    Specification of Letters Patent.    Patented Apr. 19, 1921.

Application filed July 24, 1920. Serial No. 398,630.

*To all whom it may concern:*

Be it known that I, JAKE J. KUNTZ, a citizen of the United States, residing at Oakville, in the county of Louisa and State of Iowa, have invented new and useful Improvements in Automobile-Fender Braces, of which the following is a specification.

The object of my present invention is the provision of an automobile fender brace that is susceptible of being easily and economically manufactured and is adapted to be expeditiously and easily applied to an automobile chassis.

To the attainment of the foregoing the invention consists in the improvement hereinafter described and definitely claimed.

In the accompanying drawings, hereby made a part hereof:—

Figure 1 is a transverse section showing my improved brace as properly arranged relatively to fender portions and for connection to chassis bars.

Fig. 2 is a perspective of the brace *per se*.

Fig. 3 is a transverse section showing the relative arrangement of the central lapped portions of the brace bar.

Similar numerals of reference designate corresponding parts in all of the views of the drawings.

In Fig. 1 spaces to receive chassis bars are designated by 1 and fender portions are designated by 2.

The major portion of my improved brace is formed of appropriate strips of steel or other metal compatible with the purpose of my invention and includes lower horizontal portions 3 which are lapped at the center of the brace, as indicated by 4 and are connected at such point by a bolt 5 and nut 6 or other suitable means. Each of the lower horizontal portions 3 is twisted adjacent to its outer end, as indicated by 7, and the twisted portions are merged into loops 8, horizontally disposed and provided in their upper stretches with apertures 9 for the reception of bolts 10 through the medium of which the superimposed fender portions 2 are attached thereto. The upper stretch of each loop 8 merges, in turn, into an upwardly and inwardly reaching arm 11. Each arm 11 is provided at its inner end with an upstanding terminal portion 12. The lower horizontal portions 3 are provided at their inner ends with upwardly divergent arms 13, each of which is twisted at 14 and is provided at its upper end with an upstanding terminal portion 15. The terminal portions 12 and 15 are spaced apart as indicated by 1 to receive between them the chassis bars 1, and are designed to be strongly clamped to chassis bars through the medium of bolts 16 adapted to be arranged above and below chassis bars and nuts 17 on the said bolts.

It will be manifest from the foregoing that my novel brace is adapted to be quickly and easily manufactured without the employment of expensive machinery; that it is stiff and strong; and that it is susceptible of easy application inasmuch as either end may be arranged at the right or at the left of an automobile as is most convenient.

Having described my invention, what I claim and desire to secure by Letters-Patent, is:—

1. A fender brace comprising two metallic strips, each with a lower bar portion, of greater height than thickness, twisted adjacent to its outer end, a horizontal loop at the outer end of said portion, an arm extending upwardly and outwardly from the inner end of the horizontal portion and terminating in an upstanding portion, and an arm extending upwardly and inwardly from the upper stretch of the loop and terminating in an upstanding portion; said horizontal portions being lapped at the center of the brace and said upper stretches of the loops, and the extending terminal portions being apertured, and means connecting the central lapped portions of the strips together.

2. A fender brace comprising two metallic sections having lower lapped and connected portions and also having inner and outer arms and upstanding portions on the arms to receive chassis bars between them and also having between the horizontal portions and the outer arms horizontally disposed loops to support fender portions.

In testimony whereof I affix my signature.

JAKE J. KUNTZ.